(12) United States Patent
Kurita et al.

(10) Patent No.: US 7,935,017 B2
(45) Date of Patent: May 3, 2011

(54) ECCENTRICALLY OSCILLATING SPEED REDUCER

(75) Inventors: Masakazu Kurita, Tsu (JP); Jun Hirose, Tsu (JP); Koji Kawashima, Tsu (JP)

(73) Assignee: Nabtesco Corporation, Tokyo (JP)

( * ) Notice: Subject to any disclaimer, the term of this patent is extended or adjusted under 35 U.S.C. 154(b) by 625 days.

(21) Appl. No.: 12/066,400

(22) PCT Filed: Sep. 13, 2006

(86) PCT No.: PCT/JP2006/318181
§ 371 (c)(1),
(2), (4) Date: Mar. 11, 2008

(87) PCT Pub. No.: WO2007/032400
PCT Pub. Date: Mar. 22, 2007

(65) Prior Publication Data
US 2010/0261567 A1 Oct. 14, 2010

(30) Foreign Application Priority Data

Sep. 13, 2005 (JP) .................................. 2005-265299

(51) Int. Cl.
*F16H 1/32* (2006.01)
(52) U.S. Cl. ........................................ 475/162; 475/176

(58) Field of Classification Search .................. 475/162, 475/168, 176, 177, 178, 179, 180
See application file for complete search history.

(56) References Cited

U.S. PATENT DOCUMENTS

| 3,217,566 | A | * | 11/1965 | Sanson | 475/175 |
| 2001/0044356 | A1 | * | 11/2001 | Takeuchi et al. | 475/178 |
| 2004/0192486 | A1 | | 9/2004 | Tsurumi et al. | |

FOREIGN PATENT DOCUMENTS

| JP | 02-261943 A | 10/1990 |
| JP | 09-57678 A | 3/1997 |
| JP | 2000-081097 A | 3/2000 |

* cited by examiner

*Primary Examiner* — Edwin A Young
(74) *Attorney, Agent, or Firm* — Panitch Schwarze Belisario & Nadel LLP

(57) ABSTRACT

An eccentrically oscillating speed reducer 100 includes a case 110 having inner teeth 110a, a plurality of crankshafts having outer teeth, outer teeth gears 131 and 132 having outer teeth 131a and 132a brought in mesh with the inner teeth 110a of the case 110 and eccentrically moved by the crankshafts, a carrier 140 rotatably supporting the crankshafts and rotated to move relative to the case 110 by the crankshafts, and a cylindrical gear 180 brought in mesh with the outer teeth of the crankshafts for transmitting a power inputted to one crankshaft 121 of the plurality of crankshafts to remaining crankshafts, and the cylindrical gear 180 is rotatably supported by sliding friction.

9 Claims, 6 Drawing Sheets

ECCENTRICALLY OSCILLATING SPEED REDUCER

CROSS-REFERENCE TO RELATED APPLICATION

This application is a Section 371 of International Application No. PCT/JP2006/318181, filed Sep. 13, 2006, which was published in the English language on Mar. 22, 2007, under International Publication No. WO 2007/032400 A1, and the disclosures of which are incorporated herein by reference.

TECHNICAL FIELD

The present invention relates to an eccentrically oscillating speed reducer including a gear between crankshafts for transmitting a power inputted to one crankshaft of plurality of crankshafts to remaining crankshafts.

BACKGROUND ART

There is known an eccentrically oscillating speed reducer of a background art including a plurality of crankshafts, a cylindrical gear for transmitting a power inputted to one crankshaft of the plurality of crankshafts to remaining crankshafts, and a pair of rolling bearings supporting the cylindrical gear (refer to, for example, Patent Reference 1). Patent Reference 1: JP-A-9-57678 (pages 3, 4, FIGS. 1, 3)

DISCLOSURE OF THE INVENTION

Problems that the Invention is to Solve

However, according to the eccentrically oscillating speed reducer of the background art, a problem that a number of parts is large is posed.

The invention has been carried out in order to resolve the problem of the background art and it is an object thereof to provide an eccentrically oscillating speed reducer capable of reducing a number of parts more than that of the background art.

Means for Solving the Problems

An eccentrically oscillating speed reducer of the invention is constructed by a constitution including a first member having inner teeth, a plurality of crankshafts having outer teeth, an outer teeth member having outer teeth brought in mesh with the inner teeth of the first member and eccentrically moved by the crankshaft, a second member rotatably supporting the crankshafts and rotated to move relative to the first member by the crankshafts, and an inter-crankshaft gear brought in mesh with the outer teeth of the crankshafts to be rotatably supported and transmitting a power inputted to one crankshaft of the plurality of crankshafts to a remaining crankshaft.

By the constitution, according to the eccentrically oscillating speed reducer of the invention, there are not a pair of rolling bearings as in the background art for supporting the inter-crankshaft gear, and therefore, a number of parts can be reduced more than the background art.

Further, when there is constructed a constitution in which the inter-crankshaft gear is brought in mesh with the outer teeth of the crankshafts substantially at a middle portion between both ends of the crankshafts, even when the crankshafts are bent, the outer teeth of the crankshafts and the inter-crankshaft gear are difficult to be inclined, and the inter-crankshaft gear and the outer teeth of the crankshafts are brought in mesh with each other substantially uniformly in a tooth trace direction. Therefore, according to the eccentrically oscillating speed reducer of the invention, uneven wear is difficult to be brought about at the outer teeth of the crankshafts and the inter-crankshaft gear, and reduction of service life of the outer teeth of the crankshafts and the inter-crankshaft gear can be prevented.

Further, the eccentrically oscillating speed reducer of the invention may be constructed by a constitution: in which the inter-crankshaft gear includes outer teeth brought in mesh with the outer teeth of the crankshafts.

By the constitution, according to the eccentrically oscillating speed reducer of the invention, in comparison with a constitution of forming inner teeth brought in mesh with outer teeth of the crankshafts by the inter-crankshaft gear, the inter-crankshaft gear is small-sized and fabrication cost can be reduced.

Further, the eccentrically oscillating speed reducer of the invention may be constructed by a constitution in which the inter-crankshaft gear includes inner teeth brought in mesh with the outer teeth of the crankshafts.

Further, the eccentrically oscillating speed reducer of the invention may be constructed by a constitution in which the inter-crankshaft gear frictionally slides relative to the outer teeth member by way of an oil film.

By the constitution, the eccentrically oscillating speed reducer of the invention can restrict the inter-crankshaft gear in an axial direction.

Further, the eccentrically oscillating speed reducer of the invention may be constructed by a constitution further including a bearing for rotatably supporting the second member relative to the first member, wherein an inter-crankshaft gear frictionally slides relative to the outer teeth member and the bearing by way of oil films.

By the constitution, according to the eccentrically oscillating speed reducer of the invention, a bearing having a high hardness for rotatably supporting the second member relative to the first member is utilized also for supporting the inter-crankshaft gear, and therefore, in comparison with a constitution in which the inter-crankshaft gear is supported by a member having a low hardness, reduction of service life by wear of the member can be prevented. Further, the inter-crankshaft gear can be restricted in the axial direction by making the inter-crankshaft gear frictionally slide relative to the outer teeth member and the bearing.

Further, the eccentrically oscillating speed reducer of the invention may be constructed by a constitution in which a through hole is formed substantially at a center of the second member, wherein the through hole is arranged on an inner side of the inter-crankshaft gear.

By the constitution, according to the eccentrically oscillating speed reducer of the invention, the inter-crankshaft gear is not supported by a rolling bearing as in the background art, and therefore, a diameter of the through hole can be made to be larger than that of the background art by an amount of a portion supported by the rolling bearing which is not provided to the inter-crankshaft gear.

Further, the eccentrically oscillating speed reducer of the invention may be constructed by a constitution in which the second member includes a gear inserting part inserted to the inter-crankshaft gear.

By the constitution, according to the eccentrically oscillating speed reducer of the invention, a space at inside of the speed reducer and a through hole are separated by the gear inserting part, and therefore, even when a lubricant is sealed to the space at inside of the speed reducer, the lubricant sealed to the space at inside of the speed reducer can be prevented from leaking out to the through hole.

Further, the eccentrically oscillating speed reducer of the invention may be constructed by a constitution including a plurality of the outer teeth members, wherein the inter-crankshaft gear is arranged between the plurality of outer teeth members.

By the constitution, according to the eccentrically oscillating speed reducer of the invention, the inter-crankshaft gear is brought in mesh with the outer teeth of the crankshafts at substantially a middle portion between the bearings installed at both ends of the crankshafts for supporting the crankshafts, and therefore, even when the crankshafts are bent, the outer teeth of the crankshafts and the inter-crankshaft gear are difficult to be inclined and the inter-crankshaft gear and the outer teeth of the crankshafts are brought in mesh with each other substantially uniformly in a tooth trace direction. Therefore, according to the eccentrically oscillating speed reducer of the invention, uneven wear is difficult to be brought about at the outer teeth of the crankshafts and the inter-crankshaft gear, reduction of service life of the outer teeth of the crankshafts and the inter-crankshaft gear can be prevented.

Advantage of the Invention

The invention can provide the eccentrically oscillating speed reducer capable of reducing a number of parts more than that of the background art.

BEST MODE FOR CARRYING OUT THE INVENTION

Embodiments of the invention will be explained in reference to the drawings as follows.

First Embodiment

First, a structure of an eccentrically oscillating speed reducer according to a first embodiment will be explained.

Figure 1:
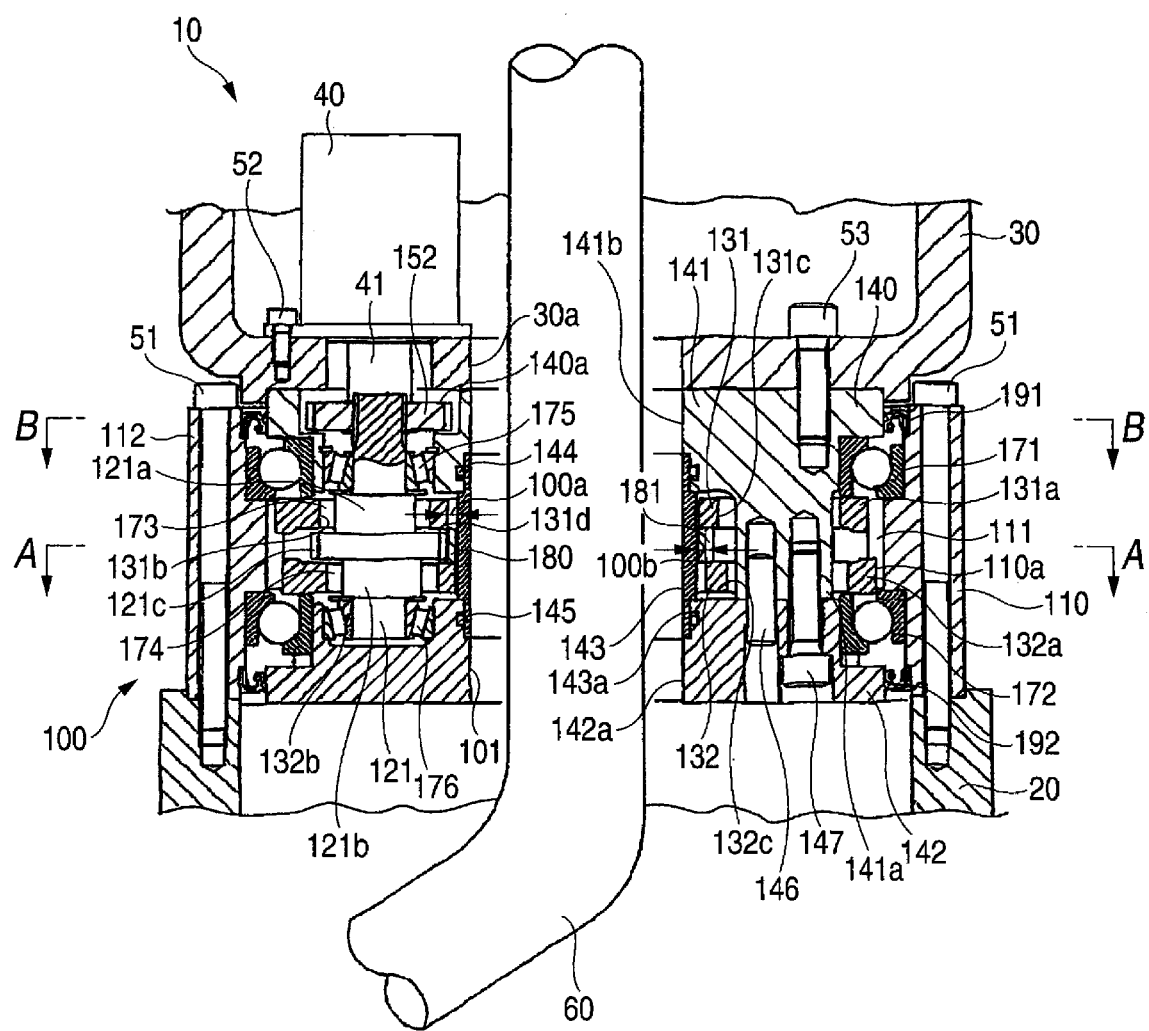
FIG. 1 is a side sectional view of a joint of an industrial robot having an eccentrically oscillating speed reducer according to a first embodiment of the invention.

As shown by FIG. 1, a joint 10 of an industrial robot includes an arm 20, an arm 30 turning relative to the arm 20, a motor 40 fixed to the arm 30 and generating a power for rotating the arm 30 relative to the arm 20, and an eccentrically oscillating speed reducer 100 fixed to the arm 20 and the arm 30 and constituting a power of the arm 30 relative to the arm 20 by the power generated by the motor 40 by reducing a speed thereof.

Figure 2:
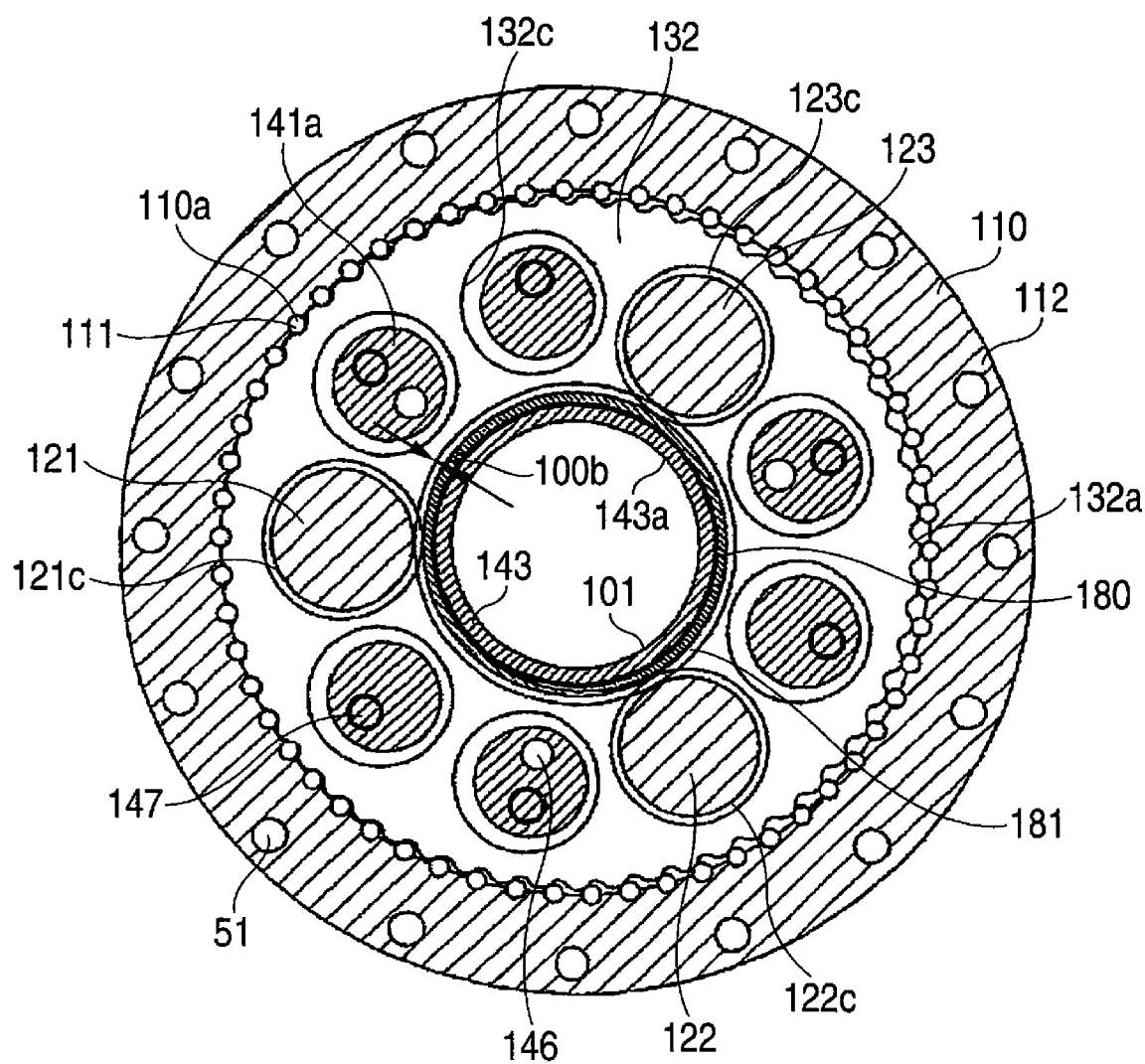
FIG. 2 is a sectional view taken along a line A-A of FIG. 1.
Figure 3:
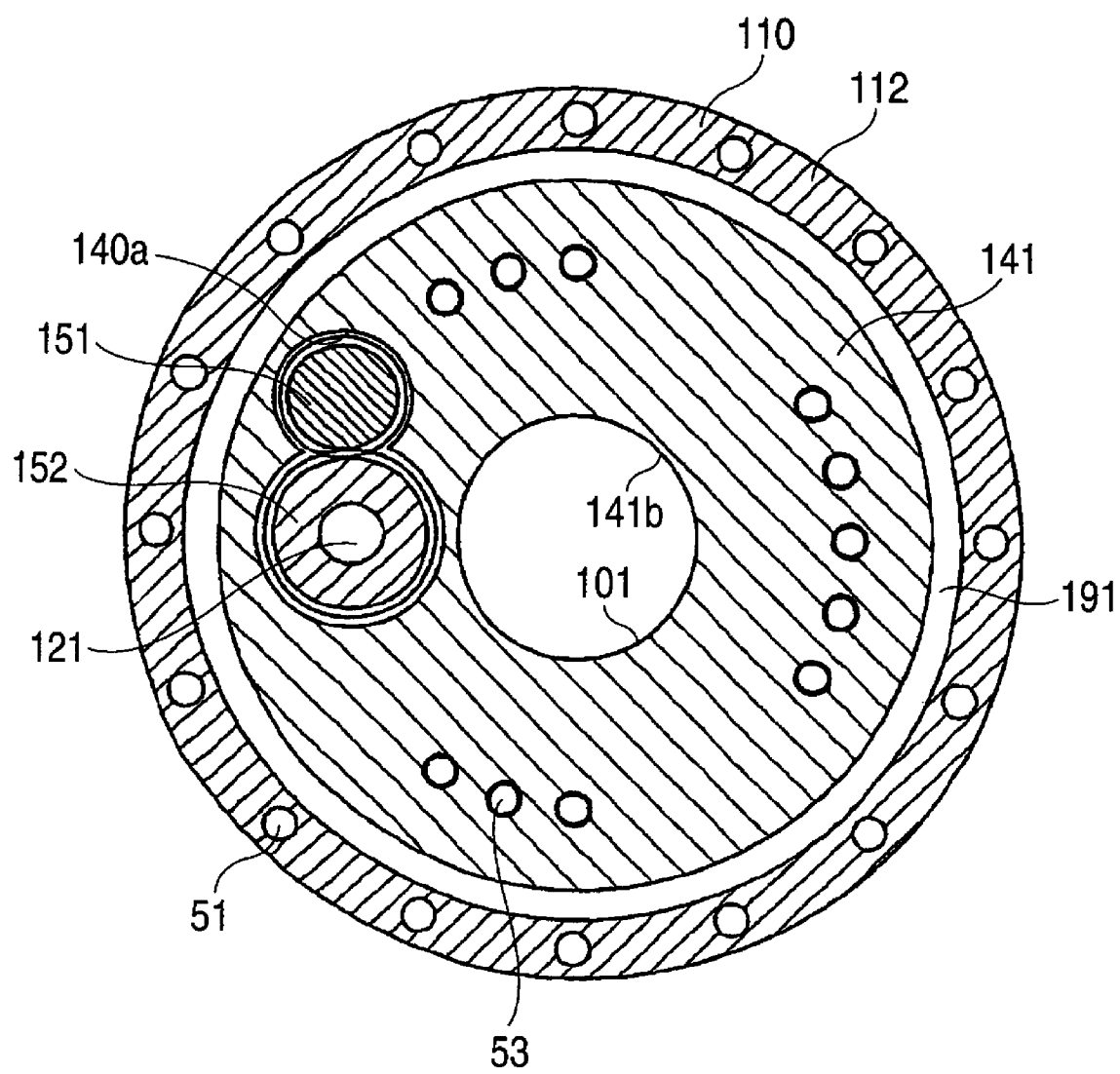
FIG. 3 is a sectional view taken along a line B-B of FIG. 1.

The eccentrically oscillating speed reducer 100 includes a case 110 constituting a first member having inner teeth 110a, a crankshaft 121 having an eccentric portion 121a, an eccentric portion 121b and outer teeth 121c, a crankshaft 122 (refer to FIG. 2) having two eccentric portions, not illustrated, and outer teeth 122c (refer to FIG. 2) similar to the crankshaft 121, a crankshaft 123 (refer to FIG. 2) having two eccentric portions, not illustrated and outer teeth 123c (refer to FIG. 2) similar to the crankshaft 121, and an outer teeth gear 131 constituting an outer teeth member having outer teeth 131a brought in mesh with the inner teeth 110a of the case 110 and eccentrically moved by the eccentric portion 121a of the crankshaft 121 or eccentric portions of the crankshafts 122 and 123, an outer teeth gear 132 constituting an outer teeth member having outer teeth 132a brought in mesh with the inner teeth 110a of the case 110 and moved eccentrically by the eccentric portion 121b of the crankshaft 121 or eccentric portions of the crankshafts 122 and 123, a carrier 140 constituting a second member moved to rotate relative to the case 110 by the crankshafts 121, 122, and 123, an input gear 151 (refer to FIG. 3) attached to an output shaft 41 of the motor 40, an outer gear 152 attached to the crankshaft 121 and brought in mesh with the input gear 151, bearings 171 and 172 for rotatably supporting the carrier 140 relative to the case 110, a bearing 173 inserted to a hole 131b of the outer teeth gear 131 and rotatably supporting the eccentric portion 121b of the crankshaft 121 relative to the outer teeth gear 131, a bearing 174 inserted to a hole 132b of the outer teeth bearing 132 and supporting the eccentric portion of the crankshaft 121 relative to the outer teeth gear 132, a bearing, not illustrated, inserted to a hole, not illustrated, of the outer teeth gear 131 similar to the hole 131b of the outer teeth gear 131 and rotatably supporting the eccentric portion of the crankshaft 122 relative to the outer teeth gear 131 similar to the bearing 173, a bearing, not illustrated, inserted to a hole, not illustrated, of the outer teeth gear 132 similar to the hole 132b of the outer teeth gear 132 and rotatably supporting the eccentric portion of the crankshaft 122 relative to the outer teeth gear 132 similar to the bearing 174, a bearing, not illustrated, inserted to a hole, not illustrated, of the outer teeth gear 131 similar to the hole 131b of the outer teeth gear 131 and rotatably supporting the eccentric portion of the crankshaft 123 relative to the outer teeth gear 131 similar to the bearing 173, a bearing, not illustrated, inserted to a hole, not illustrated, of the outer teeth gear 132 similar to the hole 132b of the outer teeth gear 132 and rotatably supporting the eccentric portion of the crankshaft 123 relative to the outer teeth gear 132 similar to the bearing 174, bearings 175 and 176 rotatably supporting the crankshaft 121 at the carrier 140, two bearings, not illustrated, rotatably supporting the crankshaft 122 at the carrier 140 similar to the bearings 175 and 176, two bearings, not illustrated, rotatably supporting the crankshaft 123 at the carrier 140 similar to the bearings 175 and 176, a cylindrical gear 180 constituting a gear between crankshafts having outer teeth 181 brought in mesh with the outer teeth 121c, 122c, and 123c of the crankshafts 121, 122, and 123 and transmitting the power from the motor 40 inputted to the crankshaft 121 to the crankshafts 122 and 123, and oil seals 191 and 192 for sealing a gap of the case 110 and the carrier 140, and the carrier 140 is formed with a through hole 101 substantially at a center thereof.

The case 110 includes a pin 111 for forming the inner teeth 110a, and a pin support member 112 embedded with the pin 111.

The crankshafts 121, 122, and 123 are arranged to be remote from each other by 120° on a circumference centering on a center point of a gear of the inner teeth 110a of the case 110.

The carrier 140 includes a circular plate 141 having a column portion 141a inserted to a hole 131c of the outer teeth gear 131 and a hole 132c of the outer teeth gear 132, a circular plate 142 arranged at a position of interposing the outer teeth gears 131 and 132 along with the circular plate 141, a hollow cylinder 143 constituting a gear inserting part both ends of which are fixed by the circular plate 141 and the circular plate 142 and which is inserted into the cylindrical gear 180, an O ring 144 for sealing a gap of the circular plate 141 and the hollow cylinder 143, an O ring 145 for sealing a gap of the circular plate 142 and the hollow cylinder 143, a positioning pin 146 for positioning the circular plates 141 and 142, and a bolt 147 for fastening the circular plates 141 and 142. Respective pluralities of the column portions 141*a*, the positioning pins 146, and the bolts 147 are arranged on a circumference centering on a center point of the gear of the inner teeth 110*a* of the case 110. Further, the carrier 140 is formed with a groove 140*a* containing the input gear 151 and the outer gear 152.

The cylindrical gear 180 is arranged between the outer teeth gear 131 and the outer teeth gear 132 and rotatably supported by being brought in mesh with the outer teeth 121*c*, 122*c*, and 123*c* of the crankshafts 121, 122 and 123. Further, the cylindrical gear 180 is rotatably supported by producing sliding friction at portions thereof in contact with the outer teeth gears 131 and 132 by way of oil films.

The through hole 101 is constituted by a hole 141*b* of the circular plate 141, a hole 142*a* of the circular plate 142 and a hole 143*a* of the hollow cylinder 143.

Further, a joint 10 includes a bolt 51 for fixing the arm 20 and the case 110, a bolt 52 for fixing the arm 30 and the motor 40, a bolt 53 for fixing the arm 30 and the circular plate 141, a hole 30*a* of the arm 30 and a wiring 60 passing the through hole 101 of the eccentrically oscillating speed reducer 100. Further, respective pluralities of the bolts 51 and 53 are arranged on a circumference centering on the axis line of the eccentrically oscillating speed reducer 100. Further, a plurality of the bolts 52 are arranged on a circumference centering on an axis line of the output shaft 41 and the motor 40.

Further, engaging faces of the arm 30 and the motor 40 and engaging faces of the arm 30 and the circular plate 141 are respectively sealed by a seal agent or the like.

Next, operation of the joint 10 will be explained.

When the motor 40 generates a power, the power generated by the motor 40 is transmitted to the crankshaft 121 by way of the input gear 151 attached to the output shaft 41 of the motor 40 and the outer gear 152 attached to the crankshaft 121 by reducing a speed thereof and is transmitted to the cylindrical gear 180 by way of the outer teeth 121*c* of the crankshaft 121 and the outer teeth 181 of the cylindrical gear 180. Here, the power transmitted to the cylindrical gear 180 is transmitted to the crankshaft 122 by way of the outer teeth 181 of the cylindrical gear 180 and the outer teeth 122*c* of the crankshaft 122 and transmitted to the crankshaft 123 by way of the outer teeth 181 of the cylindrical gear 180 and the outer teeth 123*c* of the crankshaft 123.

Further, the power transmitted to the crankshafts 121, 122, and 123 is transmitted to the outer teeth gears 131 and 132 by way of the eccentric portions 121*a* and 121*b* of the crankshaft 121 and the eccentric portions of the crankshafts 122 and 123 and is transmitted to the carrier. 140 by reducing a speed thereof by way of the outer teeth 131*a* and 132*a* of the outer teeth gears 131 and 132, and the inner teeth 110*a* of the case 110.

Therefore, the carrier 140 is rotated relative to the case 110 and the arm 30 fixed to the carrier 140 is rotated relative to the arm 20 fixed with the case 110.

As explained above, according to the eccentrically oscillating speed reducer 100, the cylindrical gear 180 is brought in mesh with the outer teeth 121*c*, 122*c*, and 123*c* of the crankshafts 121, 122, and 123 to be rotatably supported, and there are not a pair of rolling bearings as in the background art for supporting the cylindrical gear 180, and therefore, a number of parts can be reduced more than that of the background art.

Further, according to the eccentrically oscillating speed reducer 100, the cylindrical gear 180 is not supported by the rolling bearings as in the background art, and therefore, a diameter of the through hole 101 can be made to be larger than that of the background art by an amount of dispensing with a portion supported by the rolling bearing which is not provided by the cylindrical gear 180.

Further, according to the eccentrically oscillating speed reducer 100, the cylindrical gear 180 includes the outer teeth 181 brought in mesh with the outer teeth 121*c*, 122*c*, and 123*c* of the crankshafts 121, 122, and 123, and therefore, the cylindrical gear 180 is small-sized in comparison with a constitution in which the inter-crankshaft gear includes the inner teeth brought in mesh with the outer teeth 121*c*, 122*c*, 123*c* of the crankshafts 121, 122, 123. Therefore, according to the eccentrically oscillating speed reducer 100, in comparison with a constitution in which the inter-crankshaft gear includes the inner teeth brought in mesh with the outer teeth 121*c*, 122*c*, and 123*c* of the crankshafts 121, 122, and 123, fabrication cost can be reduced.

Further, according to the eccentrically oscillating speed reducer 100, the hollow cylinder 143 is inserted into the cylindrical gear 180 to separate a space at inside of the speed reducer and the through hole 101 by the hollow cylinder 143, and therefore, even when a lubricant is sealed at the space at inside of the speed reducer, the lubricant sealed at the space at inside of the speed reducer can be prevented from leaking out to the through hole 101.

Further, according to the eccentrically oscillating speed reducer 100, the cylindrical gear 180 is arranged between the outer teeth gear 131 and the outer teeth gear 132, the cylindrical gear 180 is brought in mesh with the outer teeth 121*c*, 122*c*, and 123*c* of the crankshafts 121, 122 and 123 substantially at a middle portion between the bearings 175 and 176 arranged at both ends of the crankshaft 121 for supporting the crankshaft 121 and substantially a middle portion between bearings installed at both ends of the crankshafts 122 and 123 for supporting the crankshafts 122 and 123, and therefore, even when the crankshafts 121, 122, and 123 are bent, the outer teeth 121*c*, 122*c*, and 123*c* of the crankshafts 121, 122, and 123 and the cylindrical gear 180 are difficult to be inclined, and the cylindrical gear 180 and the outer teeth 121*c*, 122*c*, and 123*c* of the crankshafts 121, 122, and 123 are brought in mesh with each other substantially uniformly in teeth streak directions. Therefore, according to the eccentrically oscillating speed reducer 100, uneven wear is difficult to be brought about at the outer teeth 121*c*, 122*c*, and 123*c* of the crankshafts 121, 122, and 123 and the cylindrical gear 180, and a reduction in service life of the outer teeth 121*c*, 122*c*, and 123*c* of the crankshafts 121, 122, and 123 and the cylindrical gear 180 can be prevented.

Further, in order to prevent a portion of the cylindrical gear 180 from being brought into the hole 131*d* of the outer teeth gear 131 inserted with the hollow cylinder 143, it is necessary that a difference of an outer diameter of the cylindrical gear 180 and an outer diameter of the hollow cylinder 143 is always larger than a distance 100*a* between a face of forming the hole 131*d* of the outer teeth gear 131 and an outer peripheral face of the hollow cylinder 143. That is, in order to prevent a portion of the cylindrical gear 180 from being brought to the hole 131*d* of the outer teeth gear 131, it is necessary that the difference 100*b* is larger than a maximum value of the distance 100*a*. Here, the maximum value of the distance 100a is set to be larger than twice as much as an eccentric amount of the outer teeth gear 131 relative to the case 110 for preventing the outer teeth gear 131 and the hollow cylinder 143 from being brought into contact with each other in an eccentric movement of the outer teeth gear 131 relative to the case 110. Although an explanation has been given of a relationship between the outer teeth gear 131 and the difference 100b in the above-described, the same goes with a relationship between the outer teeth gear 132 and the difference 100b.

Second Embodiment

First, a structure of an eccentrically oscillating speed reducer according to a second embodiment will be explained.

Further, a constitution similar to the constitution of the eccentrically oscillating speed reducer 100 (refer to FIG. 1) according to the first embodiment in a constitution of the eccentrically oscillating speed reducer according to the embodiment is attached with notation the same as that of the constitution of the eccentrically oscillating speed reducer 100 and a detailed explanation thereof will be omitted.

Figure 4:
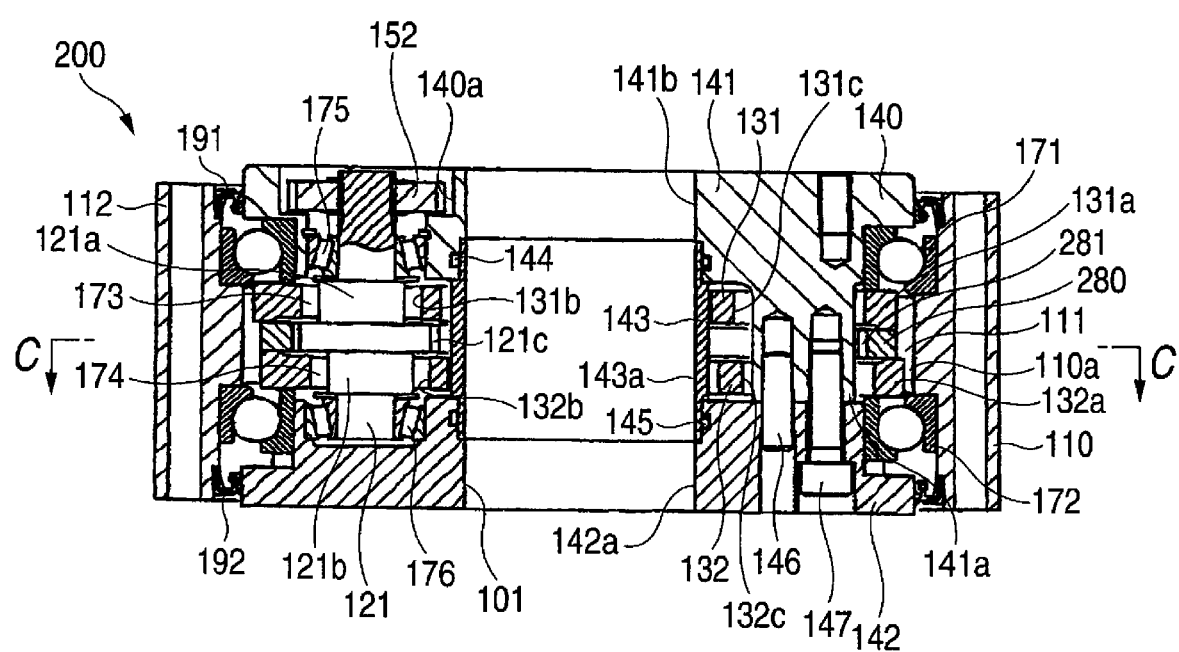
FIG. 4 is a side sectional view of an eccentrically oscillating speed reducer according to a second embodiment of the invention.
Figure 5:
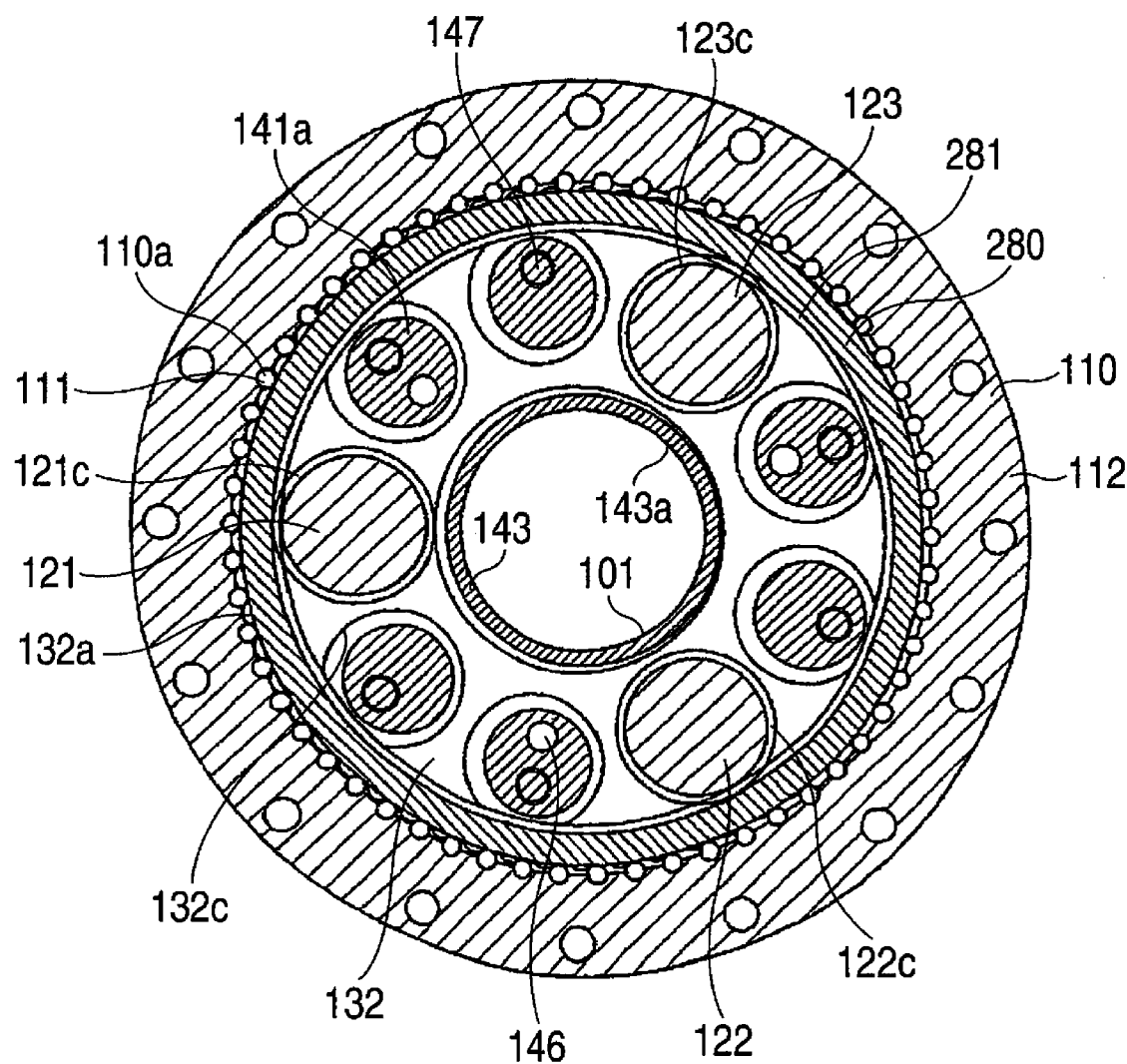
FIG. 5 is a sectional view taken along a line C-C of FIG. 4.

As shown by FIG. 4 and FIG. 5, a constitution of an eccentrically oscillating speed reducer 200 according to this embodiment is similar to a constitution in which the eccentrically oscillating speed reducer 100 is provided with a cylindrical gear 280 as a gear between crankshafts including inner teeth 281 brought in mesh with the outer teeth 121c, 122c, and 123c of the crankshafts 121, 122, and 123 for transmitting the power inputted to the crankshaft 121 to the crankshafts 122 and 123 in place of the cylindrical gear. 180 (refer to FIG. 1).

The cylindrical gear 280 is arranged between the outer teeth gear 131 and the outer teeth gear 132, and brought in mesh with the outer teeth 121c, 122c, and 123c of the crankshafts 121, 122, and 123 to be rotatably supported. Further, the cylindrical gear 280 is rotatably supported by producing sliding friction at portions in contact with the outer teeth gears 131 and 132 by way of oil films.

In this embodiment, according to the eccentrically oscillating speed reducer 200, the cylindrical gear 280 is brought into contact with a pin 111 of the case 110 at an outer periphery thereof, and therefore, even when outer teeth of the outer teeth gears 131 and 132 are separated temporarily from portions of the plurality of the pins 111 of the case 110 when the outer teeth gears 131 and 132 are eccentrically moved relative to the case 110 as in a case in which the tooth shape curves of the outer teeth gears 131 and 132 are constituted by curve portions present on the innermost sides of epitrochoidal curves laminated together by shifting phases thereof (refer to JP-B-58-42382), or in a case in which tooth shapes of the outer teeth gears 131 and 132 are constituted by shapes cut off at tooth tip portions (refer to JP-A-2-261943) or the like, the pins 111 can be prevented from being detached from the pin support member 112.

Third Embodiment

First, a structure of an eccentrically oscillating speed reducer according to a third embodiment will be explained.

A constitution similar to the constitution of the eccentrically oscillating speed reducer 200 (refer to FIG. 4) according to the second embodiment in a constitution of the eccentrically oscillating speed reducer according to the embodiment is attached with notation the same as that of the constitution of the eccentrically oscillating speed reducer 200 and a detailed explanation will be omitted.

Figure 6:
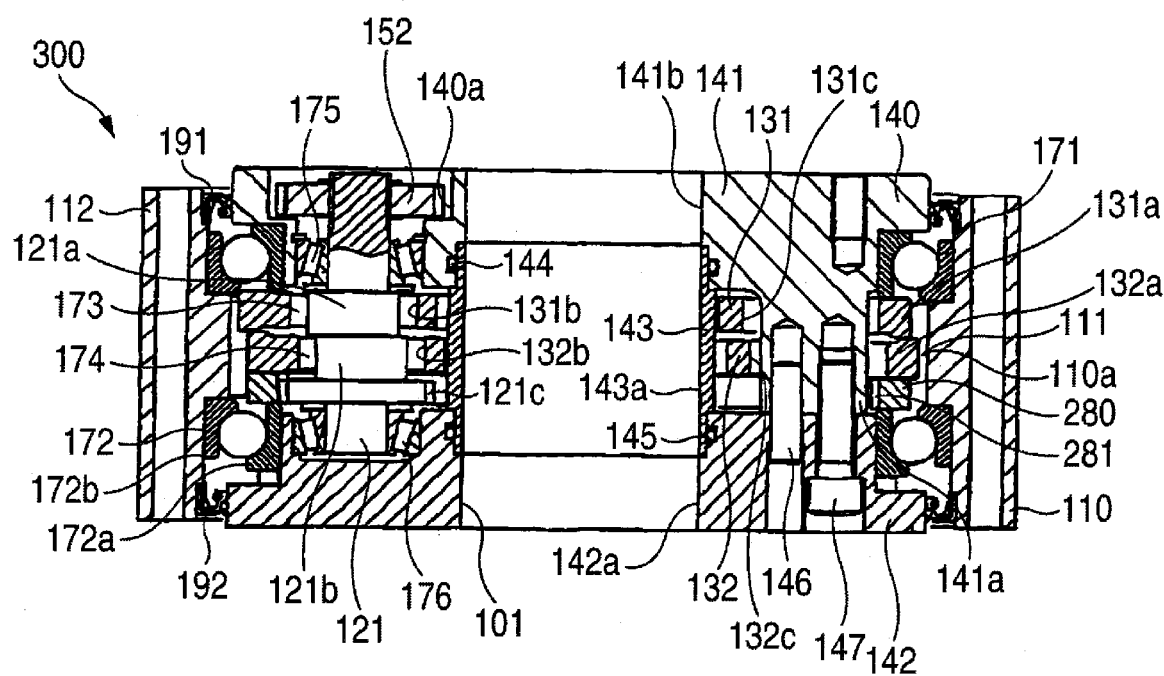
FIG. 6 is a side sectional view of an eccentrically oscillating speed reducer according to a third embodiment of the invention.

As shown by FIG. 6, a constitution of an eccentrically oscillating speed reducer 300 according to the embodiment is similar to the constitution of the eccentrically oscillating speed reducer 200 except that the cylindrical gear 280 is brought in mesh with the outer teeth 121c, 1222c, and 123c of the crankshafts to be rotatably supported between the outer teeth gear 132 and the bearing 172 in the axial direction, sliding friction is produced at portions of the cylindrical gear 280 in contact with the outer teeth gear 132 and the bearing 172 by way of oil films to be rotatably supported.

According to the eccentrically oscillating speed reducer 300, the bearing 172 having a high hardness for rotatably supporting the carrier 140 relative to the case 110 is utilized also for supporting the cylindrical gear 280, and therefore, in comparison with a constitution in which the cylindrical gear 280 is supported by a member having a low hardness, reduction in service life by wearing a member can be prevented.

Further, although according to the eccentrically oscillating speed reducer 300, the cylindrical gear 280 is constituted to produce sliding friction between the cylindrical gear 280 and an inner ring 172a of the bearing 172, the cylindrical gear 280 may be constituted to produce sliding friction between the cylindrical gear 280 and an outer ring 172b of the bearing 172.

Further, although the eccentrically oscillating speed reducer 300 is provided with the cylindrical gear 280 having an inner teeth 281 brought in mesh with the outer teeth 121c, 122c, and 123c of the crankshafts 121, 122, and 123 to be rotatably supported for transmitting the power inputted to the crankshaft 121 to the crankshafts 122 and 123, so far as the cylindrical gear is rotatably supported by a bearing for rotatably supporting the carrier 140 relative to the case 140 by sliding friction, a cylindrical gear having outer teeth brought in mesh with the outer teeth 121c, 122c, and 123c of the crankshafts 121, 122, and 123 may be provided in place of the cylindrical gear 280 as in the eccentrically oscillating speed reducer 100 (refer to FIG. 1) according to the first embodiment.

Further, although the inter-crankshaft gear of the invention is brought in mesh with the outer teeth provided at the crankshaft to be rotatably supported, by producing sliding friction at an outer periphery of the hollow cylinder 143 or an inner periphery of the pin 111 by way of oil films, the inter-crankshaft gear may further be brought into a state of being supported rotatably.

INDUSTRIAL APPLICABILITY

As described above, the eccentrically oscillating speed reducer according to the invention achieves an effect of capable of reducing a number of parts more than that of the background art and is useful as an eccentrically oscillating speed reducer or the like used at a joint portion of an industrial machine of an industrial robot or the like.

The invention claimed is:
1. An eccentrically oscillating speed reducer comprising:
a first member having inner teeth;
a plurality of crankshafts having outer teeth, an outer teeth member having outer teeth brought in mesh with the inner teeth of the first member and eccentrically moved by the crankshafts;
a second member rotatably supporting the crankshafts and rotated to move relative to the first member by the crankshafts; and
an inter-crankshaft gear brought in mesh with all of the outer teeth of the crankshafts and transmitting a power to the crankshafts, wherein the inter-crankshaft gear is not supported by bearings directly.

2. The eccentrically oscillating speed reducer according to claim 1, wherein the inter-crankshaft gear includes outer teeth brought in mesh with the outer teeth of the crankshafts.

3. The eccentrically oscillating speed reducer according to claim 1, wherein the inter-crankshaft gear includes inner teeth brought in mesh with the outer teeth of the crankshafts.

4. The eccentrically oscillating speed reducer according to claim 1, wherein the inter-crankshaft gear frictionally slides relative to the outer teeth member by way of an oil film.

5. The eccentrically oscillating speed reducer according to claim 1, further comprising a bearing for rotatably supporting the second member relative to the first member, wherein the inter-crankshaft gear frictionally slides relative to the outer teeth member and the bearing by way of oil films.

6. The eccentrically oscillating speed reducer according to claim 1, wherein a through hole is formed substantially at a center of the second member;
wherein the through hole is arranged on an inner side of the inter-crankshaft gear.

7. The eccentrically oscillating speed reducer according to claim 1, wherein the second member includes a gear inserting part inserted to the inter-crankshaft gear.

8. The eccentrically oscillating speed reducer according to claim 1, further comprising a plurality of the outer teeth members;
wherein the inter-crankshaft gear is arranged between the plurality of outer teeth members.

9. The eccentrically oscillating speed reducer according to claim 1, wherein the inter-crankshaft gear transmits a power inputted to one crankshaft of the plurality of crankshafts to a remaining crankshaft.

\* \* \* \* \*